United States Patent

Riggs

[11] 3,978,606
[45] Sept. 7, 1976

[54] FISHHOOK AND WORM LURE COMBINATION

[76] Inventor: Royal W. Riggs, 2406 Albert Lea, Sedalia, Mo. 65301

[22] Filed: July 21, 1975

[21] Appl. No.: 597,563

[52] U.S. Cl............................. 43/42.24; 43/42.37; 43/44.8
[51] Int. Cl.².......................................... A01K 85/00
[58] Field of Search................. 43/42.24, 42.37, 44.8

[56] References Cited
UNITED STATES PATENTS

| | | | |
|---|---|---|---|
| 2,564,216 | 8/1951 | Stark | 43/44.8 |
| 2,697,295 | 12/1954 | Hinds | 43/44.8 |
| 3,611,614 | 10/1971 | Ward | 43/42.24 |
| 3,724,116 | 4/1973 | Lindner et al. | 43/42.24 |

*Primary Examiner*—Louis G. Mancene
*Assistant Examiner*—Daniel J. Leach
*Attorney, Agent, or Firm*—John A. Hamilton

[57] ABSTRACT

In combination with a fishhook having the head portion of a plastic worm lure inserted over the hook shank to a position adjacent the eye of the hook, a helical spring wire coil affixed coaxially at one end to the hook shank and adapted to be threaded into the lure in the manner of a screw, the object being to provide an extremely secure, but still resiliently yieldable, connection of the lure to the fishhook.

5 Claims, 4 Drawing Figures

U.S. Patent  Sept. 7, 1976  3,978,606
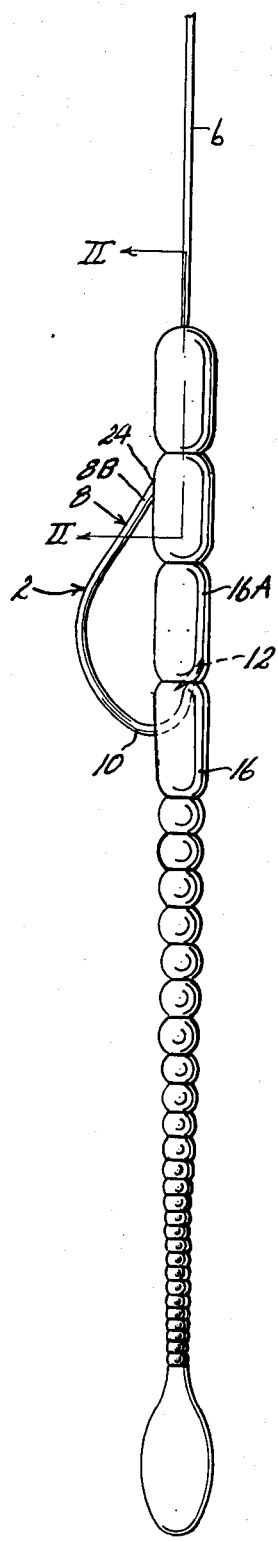
Fig. 1
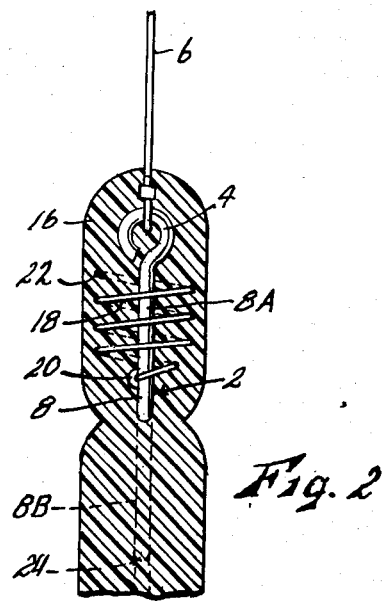
Fig. 2
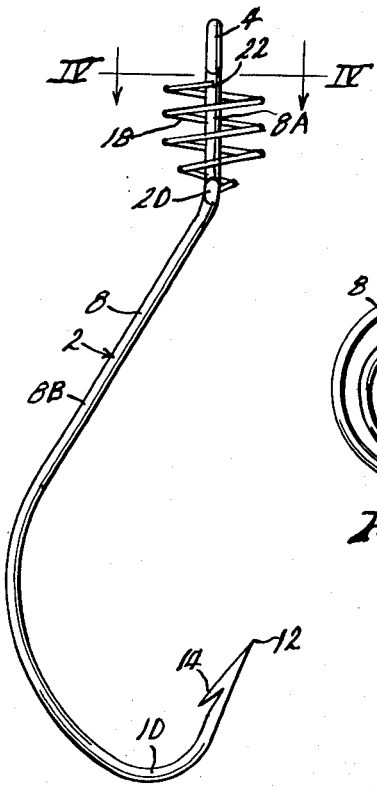
Fig. 3
Fig. 4

FISHHOOK AND WORM LURE COMBINATION

This invention relates to new and useful improvements in fishing lures, and has particular reference to lures consisting of plastic worms secured to fishhooks, such as are commonly used in bass fishing.

Plastic worms consisting of elongated bodies formed of an extremely flexible, soft plastic of almost jelly-like consistency are in extremely widespread and popular usage, when mounted on fishhooks. The usual mode of applying the worm to the hook is to insert the hook point coaxially into the nose of the lure, the lead said point out of the side of the lure at a point spaced rearwardly from the nose, and finally to slide the portion of the lure then inpaled on the hook around the bight of the hook and along its shank to a point adjacent the hook eye. The point and a major portion of the shank are then exposed exteriorly of the lure and would be snagged in underwater vegetation when the hook is drawn through the water during fishing, were not means taken to prevent it. Accordingly, it is also common practice to reinsert the point of the hook into but not through the worm body at the point of the worm then lying opposite the point of the hook. The worm body itself then acts as a "weed guard", preventing the hook from being snagged by underwater vegetation. This is often called "Texas style" fishing. When a fish then strikes, usually completely engulfing the hook in its mouth, the hook point is forced on through the worm body to be set in the fish's mouth, as permitted by elastic stretching of the worm body between the hook point and the hook eye, this being the section of the worm which previously served as a weed guard.

However, the practice outlined above is subject to certain difficulties and common malfunctions, arising from the fact that it is difficult to fasten the worm body to the hook shank adjacent the eye with sufficient security to prevent slippage. The worm is very soft, and has a virtually "self-lubricating" quality, so that it slides freely on the shank of the hook. As a consequence, when a fish strikes, it often pulls the worm section threaded on the shank of the hook along said shank toward the bight and point of the hook, causing the "weed guard" portion of the worm to be bunched or "wadded" into the bight of the hook, the sheer bulk of this wadded section of the worm often so filling the bight of the hook as actually to shield the point, so that said point does not protrude from the worm, or protrudes only slightly, and cannot be properly set in the fish's mouth. Many fisherman fishing in this style may be observed, once they feel a fish bite, pulling so strongly on the line as to virtually "upset the boat" in sometimes vain attempts to set the hook under these conditions. Even when a fish does not strike, the bunching or wadding of the weed guard section of the worm in the bight of the hook often occurs when fishing in heavy underwater brush, the vegetation itself wadding the worm into the bight of the hook, with the result that the hook cannot be set properly when a fish does bite, or that the fisherman must rearrange the worm when he retrieves the lure for another cast. Various means for fastening the worm more securely to the hook shank adjacent the eye have heretofore been proposed, such as forming barbs on the hook shank, or forming lateral offsets in the shank but none to my knowledge have been satisfactorily effective.

Accordingly, the primary object of the present invention is the provision of a hook and worm combination having an extremely secure connection of the head of the worm to the hook shank. The connection may easily be so secure that it cannot be released even by tensile pulls on the worm of sufficient magnitude to pull said worm apart. Generally, this object is accomplished by the provision of a helical formation of wire affixed coaxially to the hook shank, and embedded in the head portion of the worm.

Another object is the provision of a worm-hook combination of the character described in which the connection is resiliently yieldable, whereby to "cushion" any sudden application of pulling force to the worm, and hence to reduce any likelihood of breakage or tearing of the worm. This object is accomplished by constituting the helical wire coil as a resiliently yieldable spring, only one end of which is affixed to the shank of the hook.

A further object is the provision of a worm-hook combination of the character described in which the connection therebetween may be made and completed easily and conveniently by the fisherman himself, in deference to the fact that the fishhooks and the worms are commonly purchased as separate items by the fisherman. In this connection, the only modifications required by the present invention are changes in the fishhook itself, not the worm.

Other objects are simplicity and economy of structure, and efficiency and dependability of operation.

With these objects in view, as well as other objects which will appear in the course of the specification, reference will be had to the accompanying drawing, wherein:

FIG. 1 is a side elevational view of a fishhook and worm lure embodying the present invention, shown attached to a fishing line or leader, FIG. 2 is an enlarged, fragmentary sectional view taken on line II—II of FIG. 1, with parts left in elevation, FIG. 3 is a side elevational view of only the fishhook elements of the combination, to the same scale as in FIG. 2, and FIG. 4 is an enlarged sectional view taken on line IV—IV of FIG. 3.

Like reference numerals apply to similar parts throughout the several views, and the numeral 2 generally to a fishhook of a common design, consisting of a length of wire bent at one end to form an eye 4 into which a fishing line or leader 6 is secured, then a shank portion 8 which may be angled to produce a shorter section 8A adjacent eye 4 and a longer section 8B, then a reentrant curved bight portion 10 terminaing in a point 12 and barb 14, the point and barb portion of the hook being about parallel to longer shank section 8B. A plastic worm of ordinary design is shown at 16, consisting of a slender, elongated body of extremely soft, flexible and elastic plastic material, externally configurated to resemble a natural prey of the fish, and much longer than the fishhook itself.

The anchoring means for securing the worm 16 to the fishhook consists of a short length 18 of helical spring formed of spring wire, and disposed in coaxial relationship about the shorter section 8A of the hook shank adjacent eye 4. The end portion of the spring helix remote from eye 4 is gradually reduced in diameter, as shown, and the extreme end of the spring wire is soldered or otherwise rigidly affixed to the hook shank, as indicated at 20. The opposite end 22 of the spring wire is free.

In attaching the worm 16 to the fishhook 2, the point 12 of the hook is pressed coaxially into the nose end of the worm and pressed therethrough, exiting from the side of the worm at a point 24 spaced longitudinally apart from its nose by a distance somewhat greater than the length of shank section 8A of the hook. This insertion may be made easily, due to the sharpness of the hook point and the soft consistency of the worm. The portion of the worm then impaled on the hook is then pushed slidably along the wire forming the hook, toward eye 4, passing first around bight 10 and then along shank 8, until the nose of the lure engages the fixed end of spring coil 18. The worm is then turned rotatively around the axis of shank section 8A, while at the same time pressing the worm head toward eye 4. This causes wire coil 18 to enter the head of the worm in the manner of a screw. This motion is continued until the entire wire coil has entered the worm, and if desired, continued still further until the hook eye 4 has entered the head of the worm, as shown. Of course, the entry of the wire coil into the worm, as well as the entry of the eye 4, results in some internal cutting or tearing of the worm material. However, the worm material is very resilient as well as soft, and immediately tends to close and fill any such tears or cuts, and the worm is therefore shown as solid even after mounting, in FIG. 2. The point 12 of the hook is then pressed into, but not completely through, the body of the worm at whatever point of the worm falls opposite the point of the hook, and the worm-hook combination is ready for fishing.

When fishing, it will be seen that the portion 16A of the length of the worm between hook point 12 and spring coil 18 acts as a weed guard, preventing underwater vegetation from entering bight 10 of the hook or from becoming snagged on the point of the hook. When a fish bites, it usually substantially engulfs the hook in its mouth, and exerts a pulling force, of course opposite to the pull of fishing line or leader 6, tending both to pull the nose of the worm free of coil 18, and also to force hook point 12 on through the worm body to expose it for setting in the fish's mouth. In prior devices, the affixation of the worm nose to the hook adjacent its eye has been insecure at best, allowing it to slide along the hook shank, and causing portion 16A of the worm to be bunched or wadded into bight 10 of the hook, often to the extent that it so shielded and obstructed hook point 12 that said point did not project from the worm, or projected only so slightly, that it could not be set properly in the mouth of the fish, and the fish escaped. However, in the present device, coil 18 provides an extremely secure anchorage for the worm, the connection being so secure that it will not release the worm, or permit it to slide along the wire of the hook, even when the worm is pulled with sufficient force to break or tear it. When a fish strikes and hence exerts a pull on the worm, portion 16A of the worm therefore simply stretches elastically while its nose remains anchored on coil 18, so that hook point 12 passes on through the worm and is amply exposed to permit setting thereof in the mouth of the fish. The worm body slides away from the hook point along the wire of the hook, and no bunching or wadding of the worm in hook bight 10 can occur.

While security of anchorage of the nose of the worm is the prime object of this invention, and while this object would be obtained even if wire coil 18 were substantially rigid and inflexible, it has been found that any likelihood of breaking or tearing of the worm under the forces applied thereto by a fish is reduced by constituting said coil as a resilient spring, yieldable in a direction coaxial with the hook shank. For this purpose, the coil must be affixed to the shank at one end only, not both ends. Thus, when a fish bites and exerts a pull on the worm, the yielding of spring coil 18 "cushions" the pull, rendering it far less likely than any sudden or abrupt pull would result in rupture of the worm. In this connection, it has been found to make little difference whether the end of the spring remote from eye 4 is affixed to the hook shank, as shown, or its opposite end. The only difference is that in the former case the spring yields in compression, and in the latter case yields in tension. In either case, the cushioning effect is substantially identical. However, since another object of the invention is ease of attachment of the worm by the fisherman himself, the affixation of the spring end remote from eye, as shown, is preferred. This arrangement facilitates the screwing motion of turning the worm onto the spring, by anchoring the spring relative to the hook shank at its point of entry into the worm material, and the gradually increasing diameter of the coil tends both to keep the coil coaxially centered with the shank, and also to reduce the extent of the internal cutting or tearing of the worm material caused by the spring wire.

While I have shown and described a specific embodiment of my invention, it will be readily apparent that many minor changes of structure and operation could be made without departing from the spirit of the invention.

What I claim as new and desire to protect by Letters Patent is:

1. A fishhook and worm lure combination comprising:
    a. a fishhook comprising a length of wire formed to present successively an eye, an elongated shank, a re-entrant curved bight, and a barbed point,
    b. a slender, elongated worm of soft, elastic material disposed with its nose end adjacent said eye and extending therefrom in the direction of said shank, and
    c. an anchor member affixed to said shank adjacent said eye and embedded in the nose portion of said worm, said anchor member comprising a length of wire having the form of a helical coil of larger internal diameter than said shank, afixed to said shank in coaxial relation thereto, whereby said worm may be impaled over the point of said hook, moved slidably along the bight and shank portions of said hook to said coil, and screwed into engagement with said coil by rotating it around said shank.

2. The combination as recited in claim 1 wherein the major portion of the wire constituting said anchor member is resiliently yieldably relative to the shank of said hook in a direction longitudinal to said shank, whereby any force exerted on said worm longitudinal to said shank is cushioned.

3. The combination as recited in claim 1 wherein said anchor member constitutes a helical coil of spring wire disposed coaxially with said shank, one end of said spring wire being affixed to said shank and the other end thereof being unattached to said shank.

4. The combination as recited in claim 3, wherein the end of said spring wire coil affixed to said shank is the end thereof distal from the eye of said hook.

5. The combination as recited in claim 4 wherein the diameter of said spring wire coil, along the major portion of its length, is substantially greater than the diameter of said shank, the diameter of the end portion thereof distal from said hook eye being gradually reduced to its point of affixation to said shank.

* * * * *